United States Patent [19]

Foltz, Jr.

[11] 3,990,796
[45] Nov. 9, 1976

[54] OPTICAL MEASUREMENT OF THE DIFFERENCE IN ALIGNMENT BETWEEN REFERENCE FRAMES

[75] Inventor: John V. Foltz, Jr., Suitland, Md.

[73] Assignee: The United States of America as represented by the Secretary of the Navy, Washington, D.C.

[22] Filed: May 23, 1975

[21] Appl. No.: 580,255

Related U.S. Application Data

[63] Continuation-in-part of Ser. No. 493,298, July 31, 1974, abandoned.

[52] U.S. Cl. .............................. 356/152; 89/1.81; 356/150; 356/172
[51] Int. Cl.² ....................................... G01B 11/26
[58] Field of Search ............. 356/150, 152, 172; 89/1.81

[56] References Cited

UNITED STATES PATENTS

| | | | |
|---|---|---|---|
| 3,326,076 | 6/1967 | Burg | 356/150 |
| 3,612,694 | 10/1971 | Mottier et al. | 356/152 |
| 3,709,608 | 1/1973 | Degan et al. | 356/152 |

Primary Examiner—Maynard R. Wilbur
Assistant Examiner—S. C. Buczinski

[57] ABSTRACT

A means for the measurement of the alignment error between a plurality of coordinate reference frames and a relatively absolute reference frame determines all three degrees of freedom utilizing a single beam of light with relatively narrow angular extent. The measurement means has a light source, collimator, a plurality of reflecting folding mirrors and a pair of retroreflectors rigidly fixed to each coordinate reference frame. As the collimated light beam strikes a folding mirror it is reflected toward the corresponding coordinate reference frame where it is reflected back by the retroreflectors. The angles of tilt, twist and rotation at which it is reflected are representative of the misalignment of the coordinate reference frame. The folding mirror then reflects the retroreflected beam back toward the source, where the beams are detected. Means are provided for moving the folding mirrors out of and into the path of the issuing light beam, so that the beam may strike any of the folding mirrors and be reflected toward the corresponding coordinate reference frame. A porro reflector may also be associated with each folding mirror, enabling the measurement of the deviation of any of the folding mirrors.

6 Claims, 3 Drawing Figures

3,990,796

OPTICAL MEASUREMENT OF THE DIFFERENCE IN ALIGNMENT BETWEEN REFERENCE FRAMES

CROSS-REFERENCE TO RELATED APPLICATION

This is a continuation-in-part of Ser. No. 493,298, filed July 31, 1974, now abandoned.

BACKGROUND OF THE INVENTION

This invention relates to the optical measurement of the alignment error of the three degrees of freedom of a plurality of coordinate reference frames with the 3° of freedom of a relatively absolute reference frame. In optical alignment and measurement systems, it is relatively simple to provide a system to perform simple alignment measurements, where only 1° of freedom or a single object's position is of concern. As more alignment information is elicited and the position of more objects are measured, the systems become increasingly complex and the number of components of the systems multiply. This increasing complexity and proliferation of elements introduces a greater possibility for error and makes the measurement data obtained and consequent realignment suspect.

One example of a complex system is the launching system of a missile-carrying submarine. The submarine-missiles are arranged in two longitudinal rows along either side of the vessel, each row containing, for example, eight missiles. To provide the missiles with a homing capability, a directional target-seeking system including a guidance system is provided aboard each missile. At the instant of launch each missile's guidance system must be provided with precise information as to its present bearing, including all three degrees of freedom, if the missile is to find its target. This information has been provided in the past by generating two of the three degrees of freedom by reference to gravity and obtaining the third from the ship's inertial navigation system by an optical alignment system. An example of such a system is found in U.S. Pat. No. 3,709,608.

For numerous reasons, it has been attempted to eliminate the reference to gravity to obtain 2° of freedom of the missile bearing and instead to determine all 3° of freedom optically by comparison with the ship's gyro.

Prior art optical alignment and measurement devices have not been capable of accurately measuring the difference of alignment between all 3° of freedom of a plurality of coordinate reference frames and the three degrees of freedom of a relatively absolute reference frame by means of a simple optical alignment system.

Furthermore, none of the known prior art devices provide a means of measuring, and thus enabling compensating for, errors of optical alignment which may be inherent in these systems.

Additional prior art optical alignment means are known which employ light beams having off-axis angles or multiple beams to determine the three means are not practical. For example, in the missile launching system described above, the missile walls have only one window through which the position of the internally-located guidance system is determined. For this system, it is necessary to employ a single light beam of relatively narrow angular extent. Thus, off-axis light-beam means or multiple-beam means would not be satisfactory for the optical alignment of the components of certain systems.

SUMMARY OF THE INVENTION

Briefly, the invention for the measurement of the error of alignment between the three degrees of freedom of a plurality of coordinate reference frames and the three degrees of a relatively absolute reference frame comprises a light source, collimating means, a plurality of folding mirrors, means for moving at least one of the folding mirrors, a plurality of retroreflectors and a detector. The light source and collimating means provide a beam in optical alignment with the relatively absolute reference frame. The folding mirrors, each of which is in optical alignment with both the issuing beam and one of the coordinate reference frames, reflect the beam toward the coordinate reference frames. Means are provided for moving at least one of the folding mirrors out of and into the path of the issuing beam, enabling the beam to selectively impinge on a plurality of the folding mirrors and then be reflected toward the corresponding coordinate reference frame. One retroreflector is rigidly fixed to each of the coordinate reference frames, in optical alignment with one of the folding mirrors. The retroreflectors may be two pairs of opposing porro reflectors. The detector is located proximate the optical axis of the issuing beam. When the collimated issuing beam strikes one of the folding mirrors, the beam is reflected toward a retroreflector fixed to a coordinate reference frame. The beam will be reflected back toward the folding mirror by the retroreflector and then by the folding mirror back toward the source, where it will be detected by the detector. The angle which the detected beam makes with the optical axis of the issuing beam is representative of the difference in alignment between the relatively absolute reference frame and the coordinate reference frame. An additional feature of the invention mesures and thus enables correction of the misalignment of the folding mirror by adding a fixed porro reflector to the folding mirror. When the beam strikes the folding mirror, a portion is reflected back toward the source by the porro reflector and a portion is transmitted to aretoreflector, as described above. The difference between the angle of the porro reflected beam and that of the optical axis of the issuing beam is representative of the error introduced by misalignment of the folding mirror.

STATEMENT OF THE OBJECTS OF INVENTION

An object of the invention is to measure the error of alignment between the three degrees of freedom of a plurality of coordinate reference frames and relatively absolute reference frame by optical means which are less complex and have fewer components than known detection means.

Another object of the invention is to measure the above-mentioned error of alignment more accurately than by presently utilized detection means.

A further object of the invention is to measure errors introduced into the optical detection means resulting from the misalignment of components of the detection means, thereby enabling compensating for these introduced errors.

Yet another object of the invention is to measure the error of alignment between the 3° of freedom of a plurality of coordinate reference frames and a relatively absolute reference frame by optical means which employ a single light beam with relatively narrow angular extent.

DESCRIPTION OF THE PREFERRED EMBODIMENT

Figure 1:
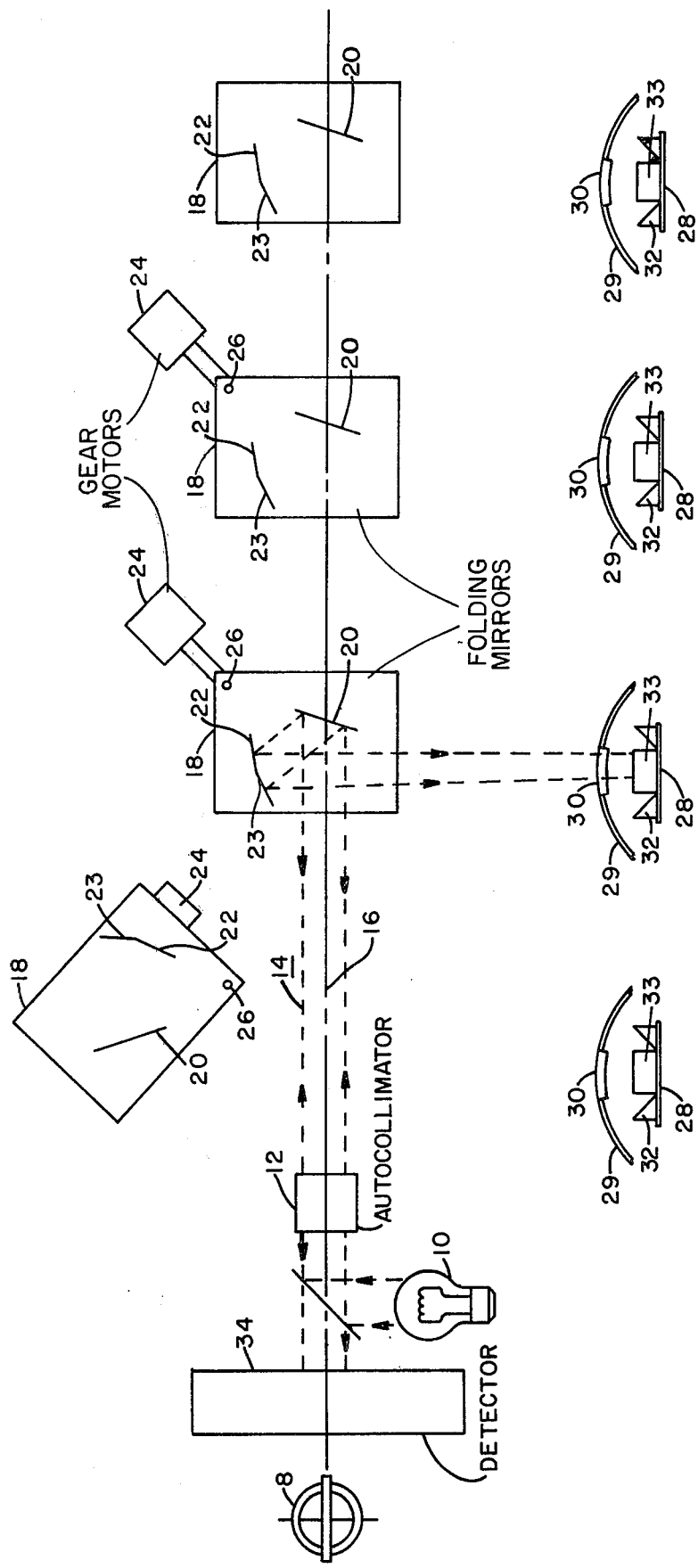
FIG. 1 is a plan view showing the components of the alignment error measurement apparatus of the invention.

Referring now to FIG. 1, a relatively absolute reference frame 8, represented here by the inertial navigation system of a seagoing vessel, is shown in optical alignment, either directly or by reflection, with an optical axis 16. A light source 10 and an autocollimator 12 provide a collimated light beam 14 directed along optical axis 16 along which are aligned a plurality of folding mirrors 18. There may be any number of folding mirrors, depending on the number of inertial reference frames it is desired to align. Folding mirrors 18 each have a planar reflective surface 20 and a first folding planar reflective surface 22, fixed at a 45° angle with respect to each other, which, by reflection, "fold" beam 14 ninety-degrees in the direction of coordinate reference frames 28. A second planar reflective surface 23 is disposed adjacent reflective surface 22 and fixed at an angle less than 45°, e.g. 42°, so that part of the beam 14 is "folded" through less than ninety-degrees, i.e., eighty-four degrees in this instance.

Folding mirrors 18 are also provided with means for moving the mirrors out of and into the path of the beam 14, so that beam 14 can selectively be made to impinge on and be folded by any of the folding mirrors. In FIG. 1, the first folding mirror 18 has been moved out of the path of issuing beam 14, allowing the beam to impinge on the second folding mirror 18, to be folded toward its associated coordinate reference frame 28, and thus to measure the deviation of this frame from that of relatively absolute reference frame 8. The means for moving the folding mirrors out of and into the path of beam 14, as depicted in FIG. 1, are electric motors and gear assemblies 24, which rotate the folding mirrors around pivot points 26. Any convenient means for the folding mirrors 18 may be used, however, such as a sliding or hinged arrangement, or by rotating the folding mirrors slightly so that beam 14 is allowed to pass through an opening between the reflective surfaces of the folding mirror.

One known system for rotating the folding mirrors used in a missile-carrying submarine is described in U.S. Pat. No. 3,709,608. This system enables the alignment of the two rows of missiles, one on the starboard and one on the port side of the submarine, using only one row of mirrors. In this system, each folding mirror has three positions, one of which folds the beam of light toward the starboard side of the submarine, one of which folds it toward the port side, and one position which allows the beam to pass through the opening between the two mirrors. It is contemplated that both the embodiments of FIG. 1 and FIG. 2, could be provided with such a system, either directly as shown, or with obvious modifications.

Coordinate reference frames 28 are represented in FIG. 1 as missile guidance platforms disposed in missiles 29 each having an optically clear window 30. Rigidly fixed to coordinate reference frames 28 and in optical alignment with folding mirrors 18 are retroreflectors 32 and 33. Retroreflectors 32 and 33 reflect the folded beam of light back on itself with a tilt of its axis and rotational change which is representative of the tilt and rotation between the three degrees of freedom of the retroreflector (and the corresponding coordinate reference frame) and the 3° of freedom of the relatively absolute reference frame. Two of the 3° of freedom may be determined by reference to the difference in the axis of the issuing beam and the beams reflected by mirror 22, giving the X and Y components of the coordinate reference frame. The third degree of freedom may be elicited from the rotational change of the beam reflected by mirror 23, providing the Z or "twist" component and thus determining the coordinate reference frame's unique position in space. Retroreflectors 32 and 33 may be two pairs of opposing porro reflectors, with the pairs of opposing porro reflectors arranged at right angles to each other. The porro reflector is a known mirror with two orthogonally positioned reflective surfaces which reflect an incident beam 180°. The use of this type of reflector has the advantage of confining all beams of light to a small path, with only minor deviations. This is an essential feature to some optical alignment systems, particularly to the alignment of missiles onboard a submarine. Since there is only one window in each missile's wall alignment of the missile's guidance system must be accomplished by a light beam of relatively small angular extent, without resorting to off-axis beams.

The retroreflected beam is in turn incident on one of the folding mirrors 18, where it is folded back along, or close to, optical axis 16. The retroreflected beam is then incident on detector 34, which may be located on or off axis 16. If detector 34 is located off axis 16 the retroreflected beam may be reflected toward the detector by a take-off mirror (not shown). Detector 34 measures the difference between the axis and the angular rotation of the folded, retroreflected beam and the axis and angular orientation of the issuring beam. This difference is representative of the error of alignment between the 3° of freedom of the relatively absolute reference frame and the 3° of freedom of the coordinate reference frame.

Figure 3:
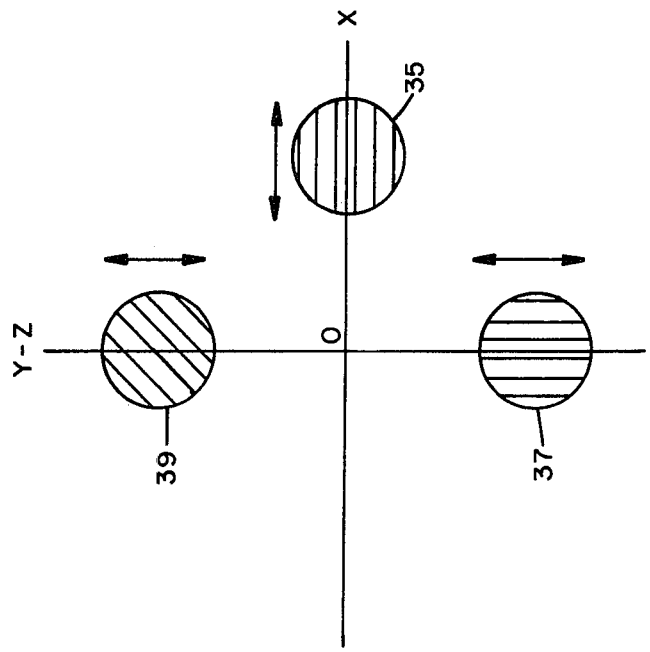
FIG. 3 is a schematic representation of an optical presentation of misalignment of a coordinate reference frame.

FIG. 3 is a schematic representation of a screen which may be used to visually observe the detected errors in displacement of the coordinate reference frames. The light dot 35 is produced by part of the beam reflected by the porro pair 33 and the folding mirrors 20 and 22. Displacement of the dot 35 along the X axis in either direction from the origin O represents displacement of the platform 28 about the axis of the porro pair 33 which is parallel to the axis of the missile 29 and perpendicular to the plane of FIG. 1. Similarly, the light dot 37 is produced by part of the beam reflected by the porro pair 32 and the mirrors 20 and 22. Displacement of the dot 37 along the Y-Z axis represents displacement of the platform 28 about the axis of the porro pair 32 which is parallel to the optical axis 16. And finally, the light dot 39 is produced by part of the beam reflected by the porro pair 32 and the folding mirrors 20 and 23. Displacement of the light dot 39 along the Y-Z axis represents displacement of the platform 28 about an axis transverse to the missile 29 and perpendicular to the optical axis 16. The beams creating the light dots 35, 37 and 39 may be passed through color filters to enable differentiation to resolve any ambiguity along the Y-Z axis. The platform 28 is, of course, aligned with the reference frame 8 when all three light dots coincide at the origin O.

Figure 2:
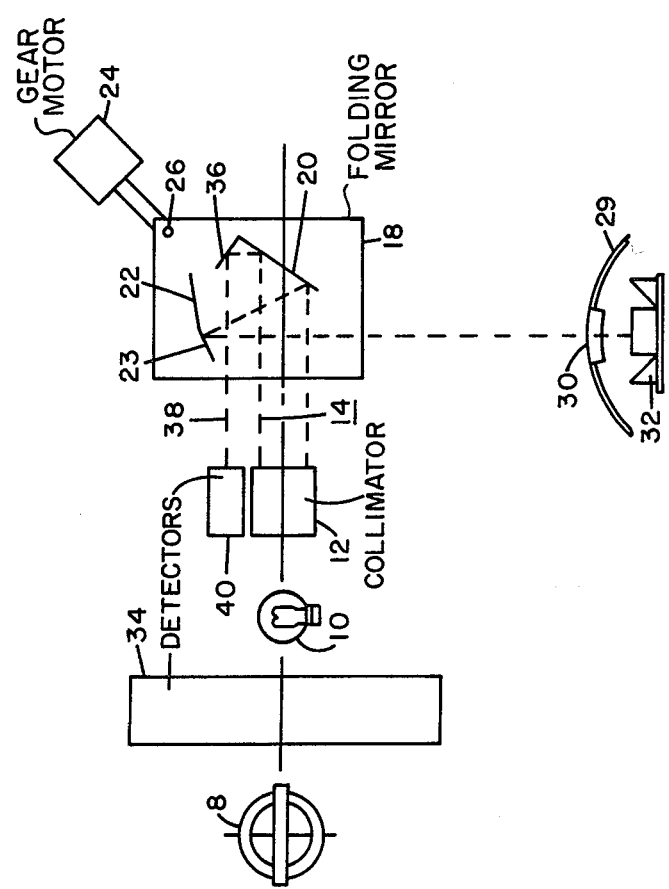
FIG. 2 is a plan view of part of the alignment error measurement apparatus of the invention showing an additional feature which detects the misalignment of the components of the measurement apparatus.

Turning now to FIG. 2, an additional feature of the invention is there illustrated for measuring and thus enabling compensating for errors of optical alignment of the folding mirrors. Since one or more folding mirrors 18 must be moved from the path of the beeam 14 to allow the beam to impinge on another folding mirror "downstream", and moved back to reflect beam 14, the possibility of the folding mirrors' becoming misaligned is greater than that of a relatively stationary mirror. The purpose of the apparatus of FIG. 2 is to measure this misalignment so that it may be corrected. The apparatus of FIG. 2 is similar to that of FIG. 1, and comprises a relatively absolute reference frame 8, light source 10, collimator 12, folding mirrors 18, means 24 for moving the folding mirrors, coordinate reference frames 28, retroreflectors 32 and 33, and detector 34. Folding mirrors 18 have base planar reflective surfaces 20 and folding planar reflective surfaces 22 and 23, by which light beam 14 is directed toward retroreflectors 32 and 33. Additionally, folding mirrors 18 are each provided with a porro planar reflective surface 36. Porro planar reflective surfaces 36 are positioned at 90° angles with respect to their respective base planar reflective surfaces 20. When light beam 14 impinges on the base surface 20 of one of folding mirrors 18, a portion of the beam is reflected onto the folding surfaces 22 and 23, and a portion is reflected onto one of the porro surfaces 36. The portion of the beam which is reflected onto one of the folding surfaces 22 or 23 is folded, retroreflected, folded again, and detected, as described above. The portion of the beam which is reflected onto one of the porro surfaces 36 is turned back toward the source, tilted from optical axis 16 at an angle representative of the misalignment of the reflecting folded mirror. This porro reflected beam 38 is then detected by detector 40, which may be the same detector as detector 34 or may be a separate detector. The angular difference between the porro reflected beam 38 and the optical axis 16 may then be used to modify the data obtained from the retroreflected and folded beam as to the position of the three degrees of freedom of the coordinate reference frame in order to correct for any errors introduced by misalignment of any folding mirror 18.

Thus, an optical measurement means has been provided which simply and accurately measures the error of alignment between a plurality of coordinate reference frames and a relatively absolute reference frame. An additional feature measures and enables compensating for misalignment of the components of the optical detection means.

What is claimed is:

1. Apparatus for the measurement of the error of alignment between the three degrees of freedom of a plurality of coordinate reference frames and the three degrees of freedom of a relatively absolute reference frame comprising:

a light source;

means for collimating the beam of light issuing from said source wherein said beam is directed along an optical axis which is adapted to be optically aligned with the relatively absolute reference frame;

a plurality of three-surface, folding mirrors each situated on said optical axis and adapted to be optically aligned with one of the coordinate reference frames, said mirrors each having a pair of folding planar optically reflective surfaces and a base planar optically reflective surface whereby the beam incident on one folding mirror may be reflected toward the coordinate reference frame with which the mirror is optically aligned;

means for moving at least one folding mirror out of and into the path of the beam of light issuing from the source, thereby allowing the beam to selectively impinge on a plurality of the folding mirrors;

a plurality of retroreflectors, each of said retroreflectors being adapted to be rigidly affixed to one of the coordinate reference frames, wherein when a beam reflected by the folding mirror toward the coordinate reference frame is incident on the retroreflector, the beam will be reflected back toward the folding mirror and reflected from the folding mirror toward the source along an axis and at an angle of rotation which deviates from the optical axis of the source by an amount representative of the error of alignment between the three degrees of freedom of the coordinate reference frame; and a detector located proximate the optical axis of the source for measuring the difference between the axis and angle of rotation of the beam reflected from the retroreflector and the folding mirror and the optical axis and angular rotational position of the issuing beam, whereby the error of alignment between the three degrees of freedom of the coordinate reference frame and three degrees of freedom of the relatively absolute reference frame may be measured.

2. The apparatus of claim 1 wherein each folding mirror includes a porro planar optically reflective surface disposed at a 90° angle with respect to the base reflector whereby a portion of the light incident on the folding mirror is reflected back toward the optical axis of the issuing beam and;

a detector located proximate the optical axis of the source for measuring the difference between the axis of the reflected beam and the axis of the source whereby the difference between the axis and the angle of rotation of the beam reflected from the retroreflector and the folding mirror, and the optical axis and angular position of the issuing beam may be corrected for the error of alignment between the axis of the beam reflected by the folded mirror and the axis of the source.

3. The apparatus of claim 1 wherein each retroreflector comprises two opposing porro reflectors disposed at a 90° angle with respect to each other.

4. The apparatus of claim 1 wherein the coordinate reference frames are missile guidance systems of a missile-carrying submarine and the relatively absolute reference frames is the inertial navigation system of a submarine.

5. The apparatus of claim 2 wherein the coordinate reference frames are the missile guidance systems of a missile-carrying submarine and the relatively absolute reference frame is the inertial navigation system of a submarine.

6. The apparatus of claim 3 wherein the coordinate reference frames are the missile guidance systems of a missile-carrying submarine and the relatively absolute reference frame is the inertial navigation system of a submarine.

* * * * *